Feb. 19, 1957  G. DILAR ET AL  2,781,811
COMBINED TREE WRAPPER AND GROUND SHEET
Filed March 28 1956
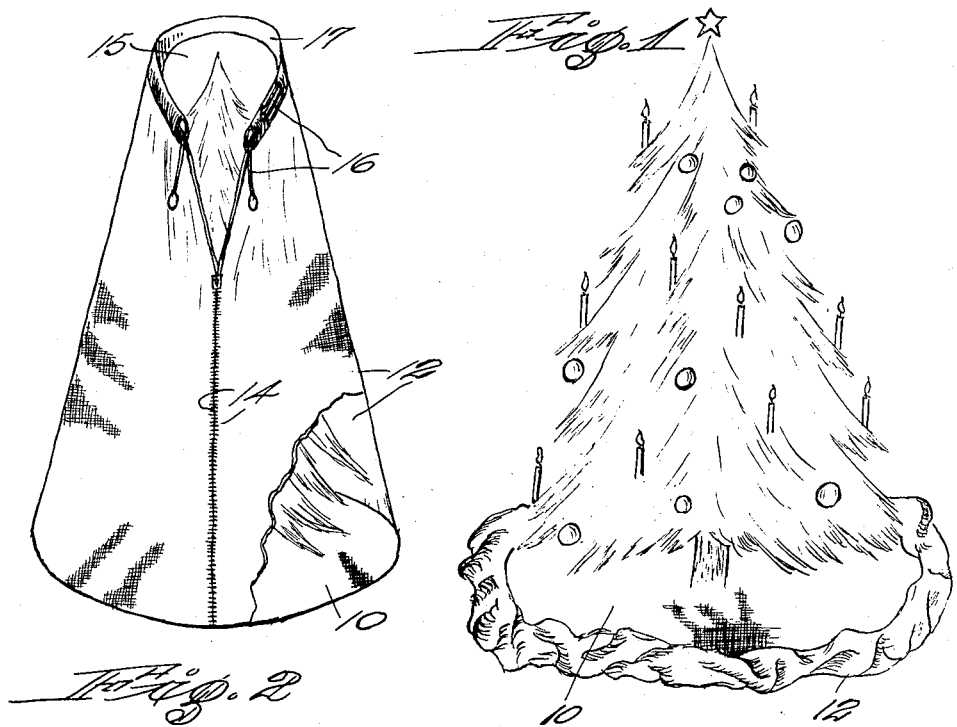
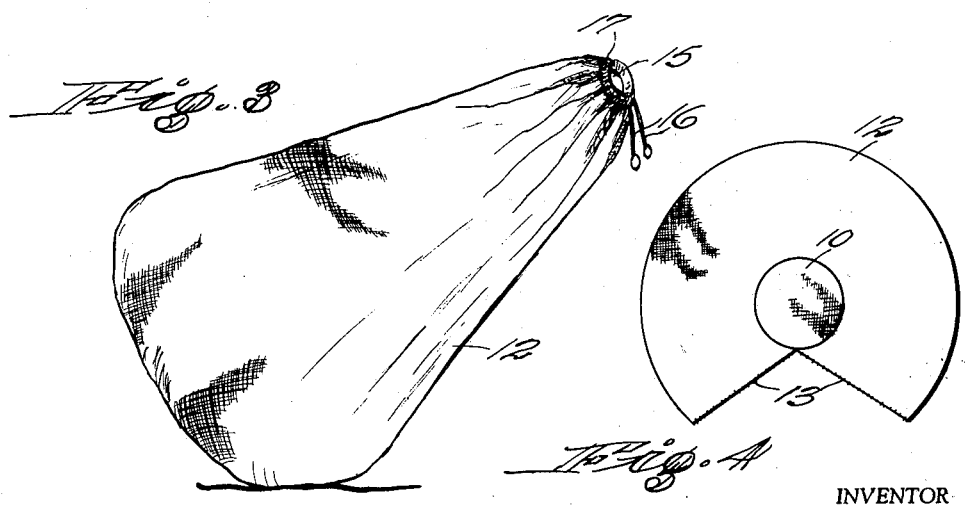
INVENTOR
GEORGIA DILAR &
GEORGE R. DILAR
BY
ATTORNEY United States Patent Office 2,781,811
Patented Feb. 19, 1957

2,781,811
COMBINED TREE WRAPPER AND GROUND SHEET

Georgia Dilar and George R. Dilar, Hamilton, Ontario, Canada

Application March 28, 1956, Serial No. 574,564

3 Claims. (Cl. 150—52)

This invention relates to improvements in tree wrappers, and more particularly to combined floor coverings or sheets and disposal wrappers or envelopes for cut Christmas trees and the like.

Essentially the invention consists of a substantially conical bag-like piece of fabric or equivalent material having a separable radial seam extending substantially from the base or centre-piece of the bag or envelope to its mouth; that is, the seam extends to the mouth when such an opening is formed by closing the seam. Otherwise, the material when the seam is open may lie roughly flat on a floor as a floor protective sheet. Further, the bag, at its mouth, is provided with a mouth closing device such as a drawstring.

After they have been erected, Christmas trees tend to dry out and the needles gradually shed and litter the floor, thus becoming a nuisance. Particularly such trees are a vexatious problem when they are due to be removed and discarded. During their disposal they are carried through doorways and any needles which might remain on the tree as this time are brushed off by contact with door-jams, and thus a trail of needles is left between the place of display and the place of disposal outside.

In order to mitigate the nuisance of falling needles during the standing period of the tree, floor-coverings, or what might be termed ground-sheets, are sometimes spread beneath the tree and treated to simulate snow, but such sheets do not serve to catch the needles which are shed during the removal of the tree.

The principal object of the present invention is to provide a combined ground-sheet and a bag or wrapper which will completely envelope the tree for disposal and will therefore catch and collect all the needles from the first fall until the tree is removed from the premises.

A second important object is to provide a device of the kind described which when the tree is bagged will bend the limbs to a position more parallel with the trunk, thus decreasing the girth of the tree for more easily carrying or dragging through doorways or between articles of furniture.

A third important object is to provide such a bag which may either be salvaged for reuse or discarded intact with the tree as trash, according to the inclination of the owner or user.

A fourth important object is to provide such a device which will be simple, effective, and inexpensive to produce and to purchase.

These together with other objects which may later appear may be attained by the structure and combination of parts which will be hereinafter more particularly described, illustrated in the accompanying drawings and specifically claimed.

Referring now to the drawing, in which like reference characters refer to corresponding parts in all the views:

Figure 1 is a perspective view of a product constructed in accordance with the present invention shown in use as a ground sheet beneath a tree.

Figure 2 is a perspective view showing the invention partially bagging the tree.

Figure 3 is a perspective view showing the invention, the tree fully bagged en route to a place of disposal; and, Figure 4 is a plan or pattern of the structure on a greatly reduced scale.

In its present embodiment the invention consists of a central disc or centre-piece 10 of fabric or other equivalent material, a siding 12 of fabric or other equivalent material stitched or otherwise suitably united to the disc in the manner of a partial rim. While the device is used as a ground-sheet the siding or rim 12 constitutes a part thereof, but when the device is used as a bag the part 12 becomes the bag siding or wall, and while functioning as said siding rises substantially or approximately the height of a tree roughly the size for which the bag is proportioned.

In order to form the bag the siding 12 has a V-shaped cut-out or gap therein, the edge portions 13 thereof being provided with complemental members 14 of separable fastener means so that such edges may be brought closely together in meeting engagement as a seam. When the edges are thus seamed and sealed the siding is upstanding and the whole presents a truncated conical bag. Preferably but not necessarily the separable fastener comprises a slide fastener, commonly known as a "zipper," but obviously any known form of separable fasteners may be substituted for the slide fastener here shown roughly in outline only by way of example.

When the seam is closed with the tree inside the bag, the mouth 15 of the bag is closed by gathering it in a pucker by suitable means such as a drawstring 16. The string or tape 16 may be trained through a tubular peripheral fold 17 in the perimeter of the material, or, for instance threaded through grommeted eyes (not shown) according to choice.

With the separable seam closed, the fully girded bag may be dragged (see Figure 3) or carried away for disposal without danger of the tree needles or fragments of former decorations being dissipated in the path taken during such disposition.

As a ground sheet, the separable seam of course is open and agape. Preferably the siding (or rim) is gathered amorphously in an annular ruffled ridge about the disc or centre-piece, on which the tree stands, which later may be left substantially or relatively smooth. The whole may then be treated to represent snow or frost, and the point may here be taken that any remnants or disintegration of crust or other materials simulating snow will be gathered up and sealed in the bag accompanying the shed needles.

We claim:

1. In a combined ground-sheet and disposal bag for cut trees, a base centre-piece of a flexible substance formed substantially disc-like and roughly conforming diametrically to the girth of the particular tree at its widest spread, a rim of flexible substance united to the centre-piece and having a V-shaped cut-out therein, the width of the rim being in rough conformity to the height of the particular tree, the marginal portions of said rim bordering the cut-out being provided with complemental members of a separable closing device whereby the rim constitutes the siding of the bag when the cut-out is closed by means of said device, and means for closing the mouth of the bag when the centre-piece and rim are thus transformed.

2. The structure according to claim 1 wherein the means for closing the mouth of the bag consist of a drawstring.

3. The structure according to claim 1 wherein the closed bag presents a substantially truncated cone.

References Cited in the file of this patent

UNITED STATES PATENTS

| 2,522,604 | Courter | Sept. 19, 1950 |
| 2,731,997 | Muth et al. | Jan. 24, 1956 |

FOREIGN PATENTS

| 496,156 | Great Britain | Nov. 25, 1938 |